United States Patent

[11] 3,591,192

| [72] | Inventors | David N. Sharp<br>Dunstable;<br>Peter Gordon Jenkins, Ponteland, both of, England |
|---|---|---|
| [21] | Appl. No. | 829,536 |
| [22] | Filed | June 2, 1969 |
| [45] | Patented | July 6, 1971 |
| [73] | Assignee | George Angus and Co. Ltd., New Castle upon Tyne, England |
| [32] | Priority | June 13, 1968 |
| [33] | | Great Britain |
| [31] | | 28241/68 |

[54] PROTECTIVE GAITERS FOR MECHANICAL EQUIPMENT
3 Claims, 1 Drawing Fig.

[52] U.S. Cl. .................................................... 277/212FB, 287/90 C
[51] Int. Cl. ...................................................... F16j 15/32
[50] Field of Search .................................................... 277/212, 212 FB, 212 C, 212 F, 178, 226; 287/87, 90 A, 90 C, 90

[56] References Cited
UNITED STATES PATENTS

| 2,754,141 | 7/1956 | Latzen | 287/90 A UX |
| 3,404,909 | 8/1968 | Gottschald | 277/87 |

*Primary Examiner*—Laverne D. Geiger
*Assistant Examiner*—Robert I. Smith
*Attorney*—Larson, Taylor & Hinds

ABSTRACT: A protective gaiter for a ball-mounted lever is made of an elastomer, for example polyurethane, and is adapted also to act as a spring resiliently pressing the ball on to its seat. The gaiter has at one end a part-spherical surface to engage the ball and has a spring-forming corrugation between that end and a flange for fixing the gaiter in position.

PATENTED JUL 6 1971 3,591,192
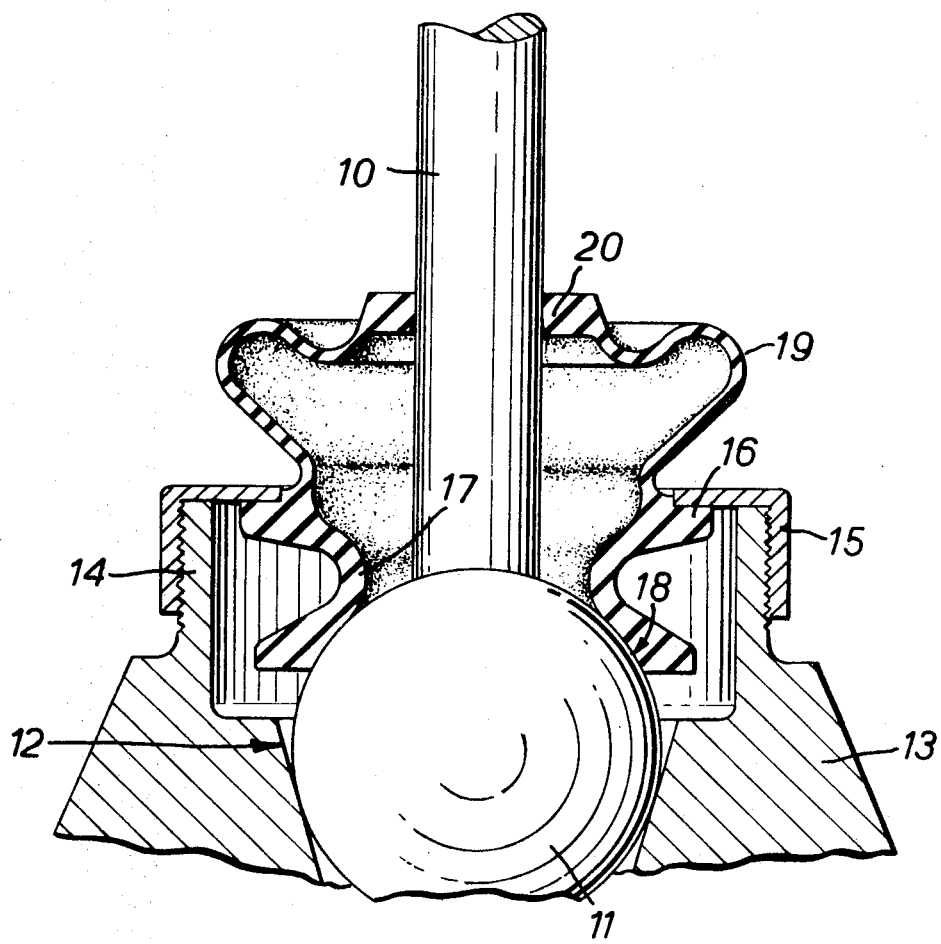

PROTECTIVE GAITERS FOR MECHANICAL EQUIPMENT

This invention comprises improvements in and relating to protective gaiters for mechanical equipment. Such gaiters are used extensively for protecting the mountings of items, such as levers, against dirt and moisture, and one well known use of such gaiters is to protect the mountings of gear levers of motor vehicles.

This invention is concerned specifically with gaiters for protecting levers and like items which have ball mountings permitting them a limited universal movement.

According to this invention, a protective gaiter intended for use with a ball-mounted item is formed as a sleeve of an elastomeric material, and the sleeve is adapted at a position between its ends for locating engagement with structure having a supporting seat for the ball, is formed beyond the attachment position towards one end to act as a spring urging an internal bearing surface adjacent the one end against the ball to urge it against its seat, and is formed beyond the attachment position towards its other end to shroud the ball-mounted item and sealingly to engage the item adjacent said other end.

By the invention not only does the gaiter protect the item but also simplifies associated structure by acting to retain the mounting ball on its seat, so that a separate component is not required for this purpose.

One example of gaiter of this invention is illustrated in the accompanying drawing which shows the gaiter in section applied to protecting a ball-mounted motor vehicle gear lever.

The lever 10 is attached to a mounting ball 11 which rests on a seat 12 provided by the surface of a frustoconical opening in a casing 13. The lever 10 thus has a limited universal movement. The casing 13 has a cylindrical flange 14 upstanding from its surface and encircling the seat 12.

The flange 14 is externally screw-threaded to receive a threaded annular cap 15 for attaching the protective gaiter to the casing structure. The form of gaiter illustrated is a sleeve of elastomeric material, for example a polyurethane moulding, having externally and at a position between its ends an axially thick outward flange 16 with a circumferential rebate to receive the top of the cap 15 so that the gaiter is retained in position.

The portion of the sleeve between the flange 16 and the ball 11 has a corrugation 17 so that it acts as a spring tending to load a part-spherical bearing surface 18 formed internally of the adjacent end of the sleeve against the ball 11 to retain it against its seat 12. In the particular arrangement, the spring portion 17 will be compressed when the gear lever is moved to reverse.

The portion 19 of the sleeve between the flange 16 and the other end of the sleeve performs the usual gaiter function of preventing access of dirt and moisture to the ball mounting and of preventing loss of lubricant from the mounting. At its extreme end 20, this portion fits snugly around the lever 10.

We claim:

1. For a mounting of the type comprising a ball, bearing socket structure receiving the ball, a lever arm projecting from and mounted by the ball for universal movement relatively to the socket structure and a protective gaiter type seal connected between the socket structure and the lever arm; a form of said gaiter type seal which is a sleeve of elastomeric material, the sleeve comprising: a first end portion having an internal bearing surface constructed to engage the ball, an attachment portion between the ends of the sleeve to retain engagement with the socket structure, an elastomeric spring portion interconnecting said first end portion and the attachment portion to resiliently load the said one end portion against the ball, and a gaiter portion extending from the attachment portion to the other end of the sleeve, said other end sealingly engaging the lever arm at a point spaced from the ball.

2. A protective gaiter according to claim 1, said attachment portion being an external, axially thick radial flange to cooperate with the socket structure.

3. A protective gaiter according to claim 1, said spring portion being a spring-forming corrugation between said attachment portion and the one end portion and said internal bearing surface which engages the ball being part spherical.